United States Patent [19]

Routledge

[11] Patent Number: 4,619,578
[45] Date of Patent: Oct. 28, 1986

[54] RETRACTABLE WHEEL SUSPENSION APPARATUS

[76] Inventor: James H. Routledge, 2904 SW. BlueGrass Way, West Linn, Oreg. 97068

[21] Appl. No.: 724,878

[22] Filed: Apr. 19, 1985

[51] Int. Cl.4 .................................................. B60P 1/02
[52] U.S. Cl. ...................... 414/498; 414/458; 414/495; 414/917; 414/476; 414/481; 180/41; 280/6 H; 280/43.23; 280/711
[58] Field of Search ............... 414/483, 484, 498, 485, 414/481, 474, 917, 476, 458, 495, 496, 497, 482; 280/6 R, 6 H, 711, 43.23; 180/41

[56] References Cited

U.S. PATENT DOCUMENTS

| | | |
|---|---|---|
| 2,560,715 | 7/1951 | Bill . |
| 2,706,009 | 4/1955 | Schramm . |
| 2,774,604 | 12/1956 | Rendel et al. . |
| 2,957,593 | 10/1960 | Evans .................................. 414/476 |
| 3,032,218 | 5/1962 | Grigonis ............................. 414/476 |
| 3,071,267 | 1/1963 | Bunch ............................. 414/483 X |
| 3,240,008 | 3/1966 | McMullen . |
| 3,240,506 | 3/1966 | McMullen . |
| 3,335,887 | 8/1967 | Snook ............................. 414/484 X |
| 3,381,768 | 5/1968 | Neely . |
| 3,578,352 | 5/1971 | Heine . |
| 3,633,775 | 1/1972 | Pugliese . |
| 3,738,680 | 6/1973 | Pollinger et al. . |
| 3,792,789 | 2/1974 | Oehler ............................. 414/498 X |
| 4,122,963 | 10/1978 | Berglund et al. . |
| 4,133,440 | 1/1979 | Heidrick, Jr. ....................... 414/483 |
| 4,174,855 | 11/1979 | Vandenberg . |
| 4,186,815 | 2/1980 | Hart ................................ 280/6 H X |
| 4,260,315 | 4/1981 | Bouffard . |
| 4,261,597 | 4/1981 | Vandenberg . |
| 4,336,663 | 6/1982 | Moberly ........................... 414/481 X |
| 4,379,572 | 4/1983 | Hedenberg . |
| 4,513,987 | 4/1985 | Whitaker .......................... 414/481 X |

FOREIGN PATENT DOCUMENTS 2222244 10/1974 France ............................... 280/43.23

Primary Examiner—Frank E. Werner
Attorney, Agent, or Firm—Henderson & Sturm

[57] ABSTRACT

A retractable wheel apparatus adapted to be attached to a frame and having a first and second arm pivotally attached along the horizontal axis. Each end of each suspension arm has a wheel assembly attached thereto and each suspension arm has a combination shock absorbing and retracting mechanism attached thereto. The first and second suspension arms are independently pivotally attached so that they can react independently to bumps in the road. Furthermore the suspension arms can move to independently pivot as a unit about the first horizontal axis to travel over irregular terrain so that the two-wheel assemblies can pivot about the first horizontal axis to minimize the amount of reciprocation of the wheel assemblies with respect to each other, which would cause excessive wear and a rougher ride. The frame is U-shaped with an open rear portion thereof so that the frame can be lowered by the retracting apparatus and backed under a container, at which time the retracting apparatus can be raised to pick up such container and transport it to its final destination, at which time a reverse procedure can be utilized to unload such container.

3 Claims, 12 Drawing Figures

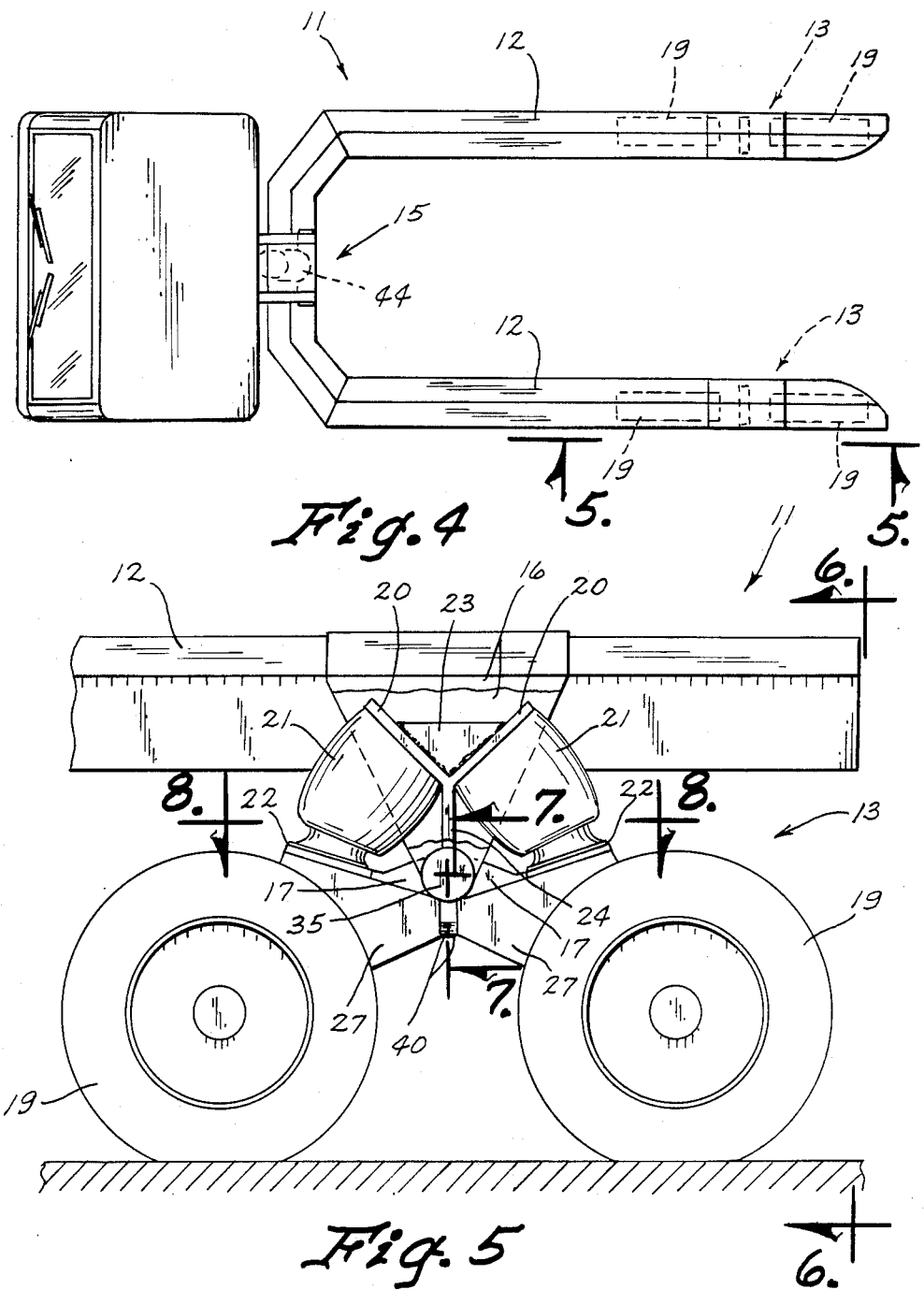

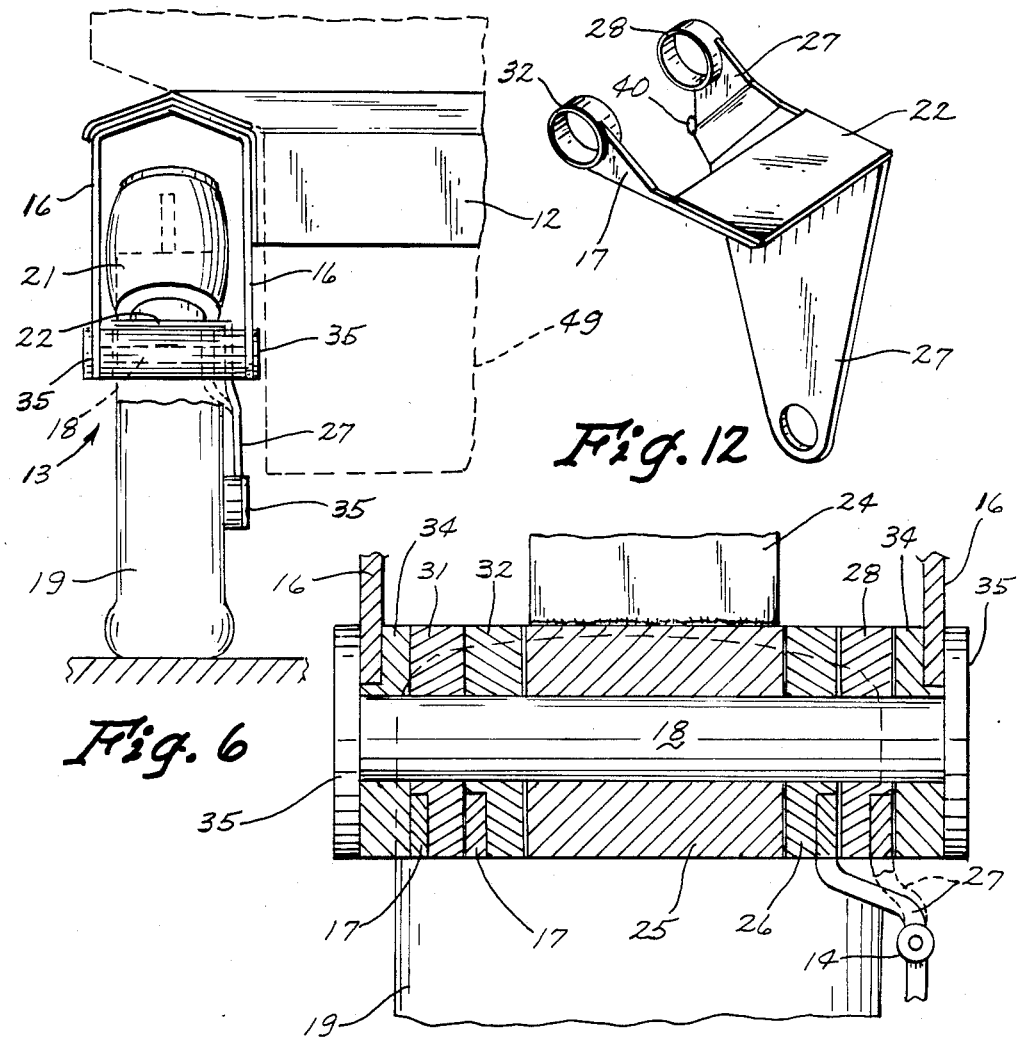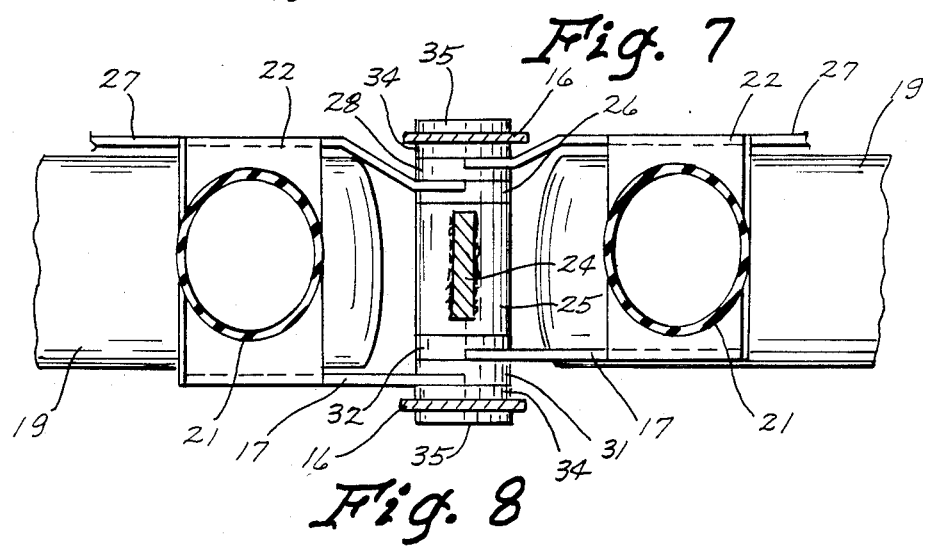

RETRACTABLE WHEEL SUSPENSION APPARATUS

TECHNICAL FIELD

The present invention relates generally to a combination suspension system and loading or unloading mechanism for a trailer or the like.

BACKGROUND OF THE INVENTION

State of the art commercial vehicles are generally configured with rear drive axles having suspensions above the axles mounted to a frame inboard of the wheel assemblies. After allowing for suspension deflection and tire clearance, the load carrying deck for these structures is typically unnecessarily high off of the ground. Accordingly, self-lifting attachments have to allow for suspension deflection when loading such a truck. This normally requires expensive hydraulically actuated mechanisms.

Due to the fact that the suspension is mounted inboard of the wheel assemblies, the load center of gravity is unnecessarily high and the loaded vehicles are subject to excessive sway or to limited side angle use. Rigid, non-articulated trucks are generally a high investment item which results in the use of a dedicated vehicle, for example a tanker vehicle, a flat bed vehicle or a dump body vehicle. Dedicated vehicles lack the ability to be versatile for varying loads.

Because prior art trailers for trucks or the like are higher than necessary, much load-carrying capability is lost between the lower part of the trailer and the road. Furthermore, state of the art trucks generally do not have efficient capability to pick up their load from the ground level. Instead, they require other equipment such as fork lifts, cranes or a loading dock to load and/or unload the cargo. Such trucks lose much efficiency when they cannot unload their cargo precisely where it is needed to be delivered without the use of such aforementioned specialized loading and unloading equipment.

DISCLOSURE OF THE INVENTION

The present invention relates to a retractable wheel apparatus adapted to be attached to a frame and having a first and second suspension pivotally attached along the horizontal axis. Each end of each suspension arm has a wheel assembly attached thereto and each suspension arm has a combination shock absorbing and retracting mechanism attached thereto. The first and second suspension arms are independently pivotally attached so that they can react independently to bumps in the road. Furthermore the suspension arms can move to independently pivot as a unit about the first horizontal axis to travel over irregular terrain so that the two-wheel assemblies can pivot about the first horizontal axis to minimize the amount of reciprocation of the wheel assemblies with respect to each other, which would cause excessive wear and a rougher ride.

According to another aspect of the invention, the frame is U-shaped with an open rear portion thereof so that the frame can be lowered by the retracting apparatus and backed under a container, at which time the retracting apparatus can be raised to pick up such container and transport it to its final destination, at which time a reverse procedure can be utilized to unload such container.

An object of the present invention is to provide a suspension apparatus for trailers or trucks which results in a smoother ride.

Another object of the present invention is to provide a combination suspension and raising and lowering apparatus for trailers.

A further object of the invention is to provide a combination suspension and raising and lowering mechanism for a trailer which eliminates the need for an axle and which prevents separate wheel assembly and suspension assemblies on opposite sides of such frame so that irregular terrain can independently be encountered by such independent suspension.

A still further object of the invention is to provide a suspension system which lowers the center of gravity of the trailer truck as compared to state of the art trailer trucks.

A further object of the present invention is to provide a suspension system of the aforementioned types which reduces the tendency to sway from side to side when in use.

A further object of the present invention is to provide a combination suspension and raising and lowering apparatus which is versatile enough to be utilized for many different kinds of containers as well as for pleasure boats, for the purpose of eliminating a dedicated trailer.

Other objects, advantages, and novel features of the present invention will become apparent from the following detailed description of the invention when considered in conjunction with the accompanying drawings.

BRIEF DESCRIPTION OF THE DRAWINGS

FIG. 4 is a top plan view of the preferred embodiment of the present invention;

FIG. 5 is an enlarged partial view taken along line 5—5 of FIG. 4;

FIG. 6 is an enlarged partial view taken along line 6—6 of FIG. 5;

FIG. 7 is an enlarged partial cross sectional view taken along line 7—7 of FIG. 5;

FIG. 8 is an enlarged partial cross sectional view taken along line 8—8 of FIG. 5;

FIG. 10 shows a side elevational view of the front end of a trailer adapted to be attached to a ball hitch or the like;

FIG. 12 is a perspective view of a suspension arm assembly constructed in accordance with the present invention.

BEST MODES FOR CARRYING OUT THE INVENTION

Figure 1:
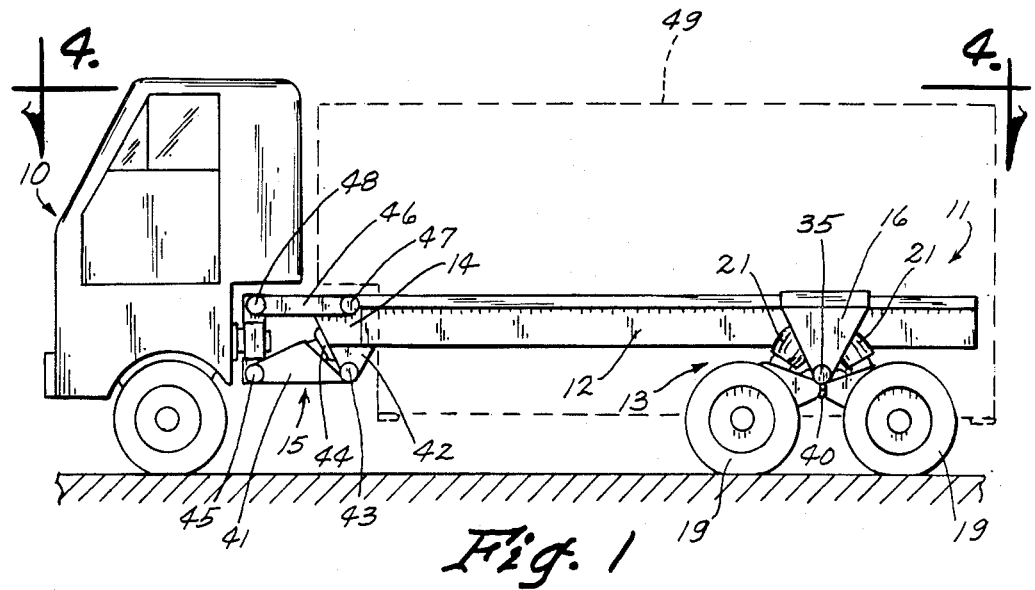
FIG. 1 is a side elevational view of a semi-trailer truck constructed in accordance with the present invention and having a container shown in dashed lines in the loaded position.

Referring now to the drawings, wherein like reference numerals designate identical or corresponding parts throughout the several views, FIG. 1 shows a semi-trailer truck (10) having a trailer mechanism (11) constructed in accordance with the present invention attached to the rear thereof. The trailer (11) has a side longitudinal frame member (12) and a side suspension and wheel assembly (13) attached thereto. A front leg portion (14) of the frame has a front raising and lowering assembly (15) attached thereto.

Referring to FIG. 5 it is noted that a suspension bracket (16) is rigidly attached to the side frame member (12) and this suspension bracket (16) has a pair of suspension arms (27) rotatably attached thereto by a pin (18), shown in FIG. 7. Suspension arms (27) have wheel assemblies (19) rotatably attached at one end thereof. An intermediate portion of each of the suspension arms (27) have air bags (21) attached thereto. The other end of the air bags (21) are sealingly attached to leg members (20) which are secured by a bracket (23) to the frame member (12). A supporting leg (24) secures the bracket members (20) to a central portion (25), as can readily be seen in FIGS. 7 and 8. Suspension arms (27) are connected to the plate brackets (22) and to bearings (26) and (28) to make suspension arms (27) pivotally attached about the pivot pin (18). The legs (17) are attached to the plate brackets (22) respectively in a rigid fashion and to bearing members (31) and (32) respectively on the other end thereof, so that the wheel assemblies (19), plate brackets (20) and (22), air bags (21) and suspension arms (27) can pivot about the pivot pin (18). Outer bearing members (34) are also disposed on the pivot pin (18), and inner and outer retainer members (25) hold members (26), (28), (31), (32) and (34) onto the shaft (18). Stop members (40) are attached to intermediate portions of the suspension arms (27) to prevent the suspension arms (27) from pivoting together further than the predetermined distance shown in FIG. 5.

Figure 2:
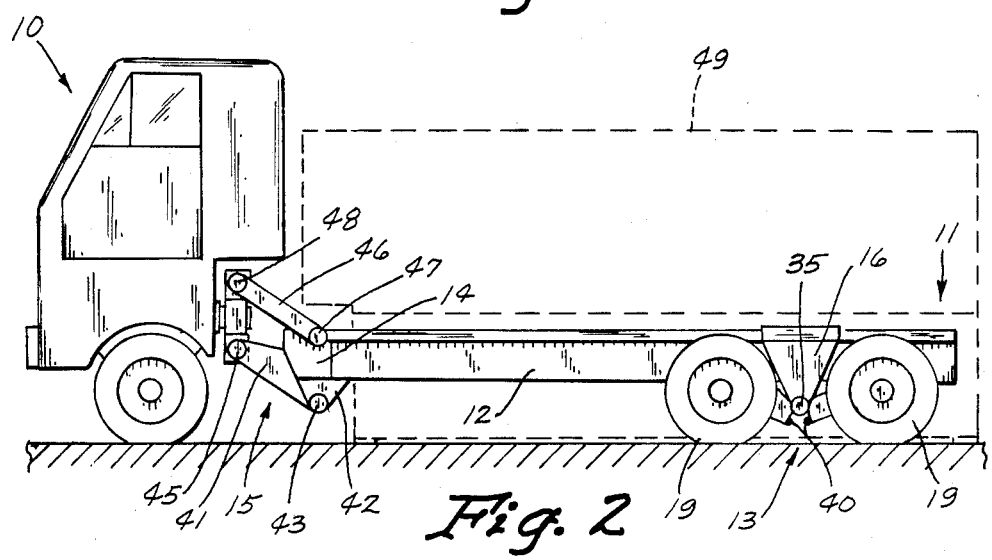
FIG. 2 is a side elevational view like FIG. 1 but showing in dashed lines the position of the container being unloaded or loaded by lowering the frame of the trailer.

Referring to FIGS. 1 and 2, it is noted that a suspension arm (41) is pivotally attached to the frame section (14) by a bracket (42) and pivot pin (43). An air bag (44), similar to air bags (21) shown in FIG. 5, is attached at one end thereof to the suspension arm (41) and at the other end to the frame (14). The truck (10) has a pivotal attachment (45) for pivotally attaching the other end of the suspension arm (41) to the truck. A link member (46) is pivotally attached by pin (47) to the frame portion (14) of the trailer (11) and at the other end thereof by a pin (48) to the truck (10).

Figure 9:
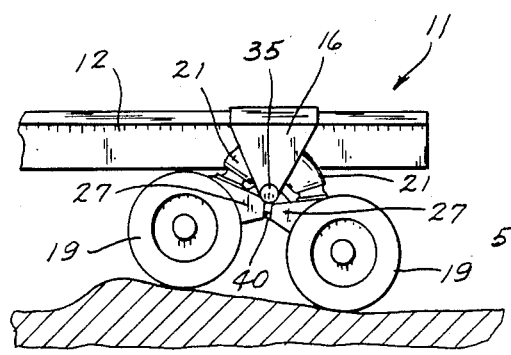
FIG. 9 is a partial view similar to FIG. 1 but showing the combination suspension and raising and lowering apparatus in a position wherein the terrain is uneven therebelow.

In operation of the embodiment showing FIGS. 1-9, it is noted that FIG. 1 shows the trailer (11) in an elevated position and having a container (49) shown in dashed lines loaded onto the frame (11) for transporting it from place to place. When the trailer (11) encounters irregular terrain, for example as shown in FIG. 9, the entire assembly (13) shown in FIG. 9 will pivot about a horizontal axis through the pin (18), whereby the wheel assemblies (19) will pivot as a unit with suspension arms (27), air bags (21) and plate members (20) and (22). When the air bags (21) are filled to a desired level according to the softness or stiffness of the suspension desired and when one of the wheel assemblies (19) hits a bump or the like, it can deflect upwardly, thereby causing that particular wheel assembly (19) and suspension arm (27) to deflect upwardly, whereby the stops (40) will be moved apart to some extent.

Because all of the air bags (21) and (44) are supplied by a common source of pressurized air, the amount of air and the pressure thereof in such air bags (21) and (44) can be regulated by a conventional control (not shown) in the cab of the truck (10). This control can be utilized to adjust the stiffness of the ride and this control can also be utilized to raise or lower the trailer portion (11), for example between the positions shown in FIGS. 1 and 2 or to any position therebetween.

Figure 3:
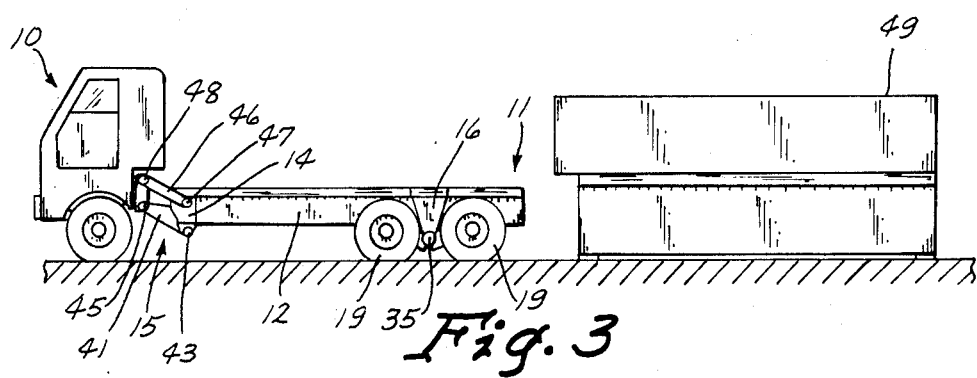
FIG. 3 is a side elevational view of the apparatus shown in FIGS. 1 and 2 and showing a container which can readily be loaded by lowering the frame of a trailer constructed in accordance with the present invention or unloaded by a reverse procedure.

For example referring to FIG. 3 it is noted that a container (49) full of cargo is setting on the ground at such time. At such time the control in the cab can be utilized to let the air out of the air bags (21) and (44) so that the frame (11) will be lowered to the position shown in FIGS. 2 and 3. The truck (10), as shown in FIG. 3, can be backed up to the position shown in FIG. 2, whereby the container (49) is disposed between the legs (12) of the trailer (11). The controls within the cab are then utilized to reinflate the air bags (21) and (44) so that the frame (11) moves upwardly to the position shown in FIG. 1, whereby the container (49) shown in dashed lines in FIG. 1 is loaded and can be transported from place to place and to its final destination. Once the container (49) is at its destination, then a reverse procedure is utilized wherein the control within the cab (10) is utilized to release the air from the air bags (21) and (44) whereupon the trailer (11) will be lowered to the position shown in FIG. 2, and the truck (10) and trailer (11) can be driven out from under the container (49) as is shown in FIG. 3.

Figure 10:
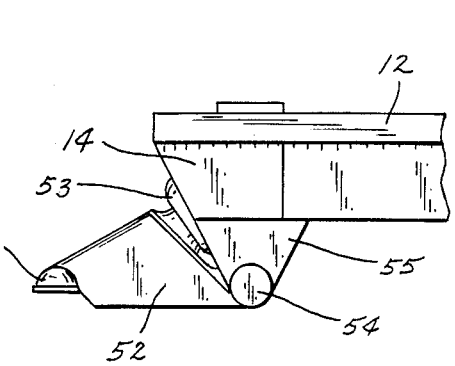
Figure 11:
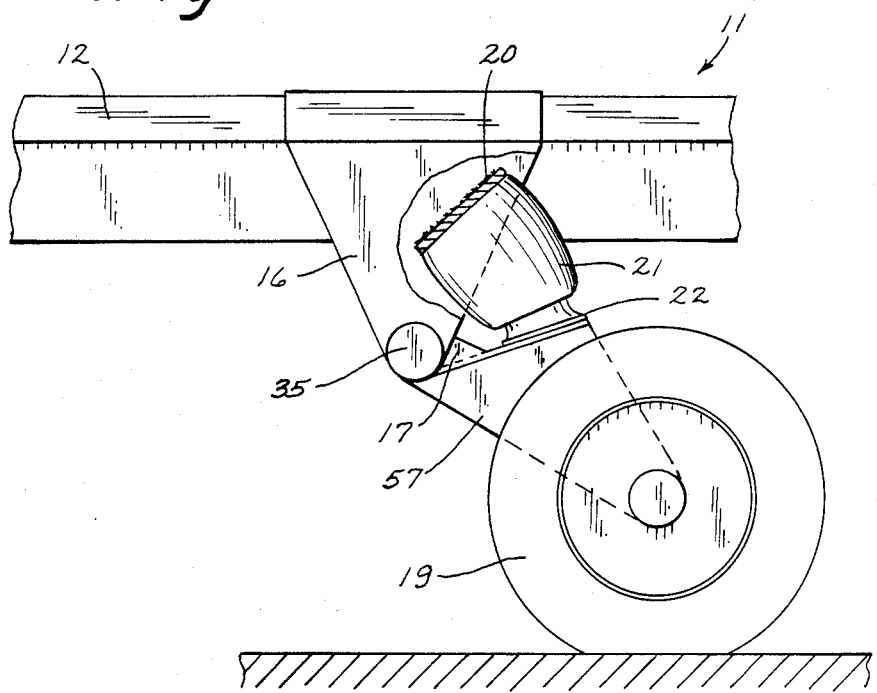
FIG. 11 shows an alternate form of the present invention having only one suspension arm, one wheel assembly and one air bag assembly.

Referring to FIGS. 10 and 11, an alternate embodiment of the present invention is shown wherein a frame (12) and (14) of a trailer can be attached to a ball and hitch mechanism by a ball hitch structure (51) rigidly attached to the front of a suspension arm (52). The suspension arm (52) is pivotally attached to the front of the frame (14) by a pivot mechanism (54) and a bracket (55). An air bag structure (53) is connected to the suspension arm (52) intermediate the ends thereof and is attached sealingly to the frame (14) of the other end thereof.

Referring to FIG. 11 it is noted that only one suspension arm (57) is connected to the bracket (16) and that this suspension arm (57) has an air bag structure connected to it in the way shown in FIG. 5 and as described above.

The operation of the alternate embodiment shown in FIGS. 10 and 11 is precisely like the operation described above with respect to the embodiment in FIGS. 1-9 in that when the air in air bags (21) and (53) is released, the frame members (12) and (14) will lower; and when the air bags (21) and (53) are pressurized, the frame members (12) and (14) will raise again. Furthermore the air bag (21) can have the pressure therein adjusted to provide the desired degree of stiffness of ride to allow deflection when the wheel assembly (19) hits a bump or the like; and the wheel assembly (19), the suspension arm (57), the air bag (21) and bracket (22) can independently pivot as a unit about the pin (15) pivotally attached to the bracket (16) similar to what is shown in FIG. 9.

Obviously many modifications and variations of the present invention are possible in light of the above teachings. It is therefore to be understood that, within the scope of the appended claims, the invention may be practiced otherwise than as specifically described.

I claim:

1. A self loading retractable two wheel suspension apparatus for a trailer attached to a vehicle via an articulated linkage; wherein the trailer comprises a generally U-shaped frame having an open center and end, and a closed front and sides; and, wherein said suspension apparatus comprises:

a downwardly depending suspension bracket operatively secured to each side of said frame and having a pair of inclined plates formed intermediate the ends of the suspension bracket;

a pivot pin operatively secured to one end of said suspension bracket;

a first and second suspension arm operatively and independently secured to said suspension bracket and mounted on one end to said pivot pin for relative movement with respect to one another said pin being in a plane bi-secting the angle between said inclined plates on said suspension bracket with an extension of said plane forming a stop for the arms, wherein each suspension arm comprises:

attaching means for operatively pivotally attaching one end of the suspension arms to said frame along a first horizontal axis on said pin;

a wheel assembly;

means for rotatably attaching said wheel assembly to the other end of the suspension arms along a second horizontal axis;

retracting means for selectively operably pivoting said arm means about said first horizontal axis between a first position wherein said second horizontal axis is below and to the side of said first horizontal axis and a second position wherein said second horizontal axis is to the side and above said first horizontal axis; wherein said retracting means are operably attached at one end thereof to respective ones of said inclined plates on said suspension bracket and operably attached at the other end thereof to an intermediate portion of the suspension arms, for the purpose of providing independent suspensions for said wheel assemblies when the terrain beneath one of said wheel assemblies is higher than the terrain below the other wheel asembly, whereby the retracting means are provided to actuate the articulated linkage intermediate the vehicle and trailer frame as a consequence of the raising and lowering of the trailer frame to effect the loading and unloading of said trailer frame.

2. The apparatus of claim 1, wherein the retracting means comprises air bag means operably attached at one end thereof to said suspension bracket and operably attached at the other end thereof to an intermediate portion of the suspension arms.

3. The apparatus of claim 2, including means for selectively controlling the flow of air in said air bag means whereby when the air is exhausted from the air bag means, the arm means will move to the respective second positions thereof and whereby the amount of air pressure in said air bag means controls the stiffness of ride of said frame when said air bags are pressurized to an extent that the suspension arms are moved to the first position thereof, respectively.

* * * * *